United States Patent
Tafuku et al.

(10) Patent No.: US 7,502,494 B2
(45) Date of Patent: Mar. 10, 2009

(54) FACE ORIENTATION DETECTION APPARATUS, FACE ORIENTATION DETECTION METHOD, AND COMPUTER MEMORY PRODUCT

(75) Inventors: Akiyoshi Tafuku, Oita (JP); Kozo Baba, Oita (JP); Hisao Ito, Oita (JP)

(73) Assignee: Fujitsu Limited, Kawasaki (JP)

( * ) Notice: Subject to any disclaimer, the term of this patent is extended or adjusted under 35 U.S.C. 154(b) by 793 days.

(21) Appl. No.: 10/763,185

(22) Filed: Jan. 26, 2004

(65) Prior Publication Data

US 2004/0151350 A1    Aug. 5, 2004

(30) Foreign Application Priority Data

Jan. 30, 2003  (JP)  ............... 2003-022498

(51) Int. Cl.
  *G06K 9/00* (2006.01)
  *G06K 9/32* (2006.01)

(52) U.S. Cl. ....................... 382/118; 382/289

(58) Field of Classification Search ........... 382/117, 382/118, 216, 115, 289, 190, 291
See application file for complete search history.

(56) References Cited

U.S. PATENT DOCUMENTS 6,611,613 B1 * 8/2003 Kang et al. .......... 382/118
7,215,828 B2 * 5/2007 Luo .................... 382/289

FOREIGN PATENT DOCUMENTS

| JP | 1-314385 | | 12/1989 |
| JP | 6-243367 | | 9/1994 |
| JP | 06243367 A | * | 9/1994 |
| JP | 06333023 A | * | 12/1994 |
| JP | 08-153197 | | 6/1996 |
| JP | 8-300978 | | 11/1996 |
| JP | 09-163212 | | 6/1997 |
| JP | 09-190522 | | 7/1997 |
| JP | 2000-097676 | | 4/2000 |
| JP | 00-137788 | | 5/2000 |
| JP | 00137788 | * | 5/2000 |
| JP | 2000-193420 | | 7/2000 |

OTHER PUBLICATIONS

Xiao-guang Lv Jie Zhou Chang-shui Zhang; IEEE; A Novel Algorithm for Rotated Human Face Detection; 2000; pp. 1-6; [retrieved on Nov. 28, 2007]. Retrieved from the Internet:<:http://ieeexplore.ieee.org/iel5/6894/18553/00855897.pdf>.*

Japanese Patent Office Action, mailed Apr. 30, 2008 and issued in corresponding Japanese Patent Application No. 2003-022498.

Japanese Office Action mailed Jul. 22, 2008 in the corresponding Japanese Patent Application No. 2003-022498 (3 pages with 5 additional pages of English translation).

* cited by examiner

*Primary Examiner*—Sherali Ishrat
(74) *Attorney, Agent, or Firm*—Staas & Halsey LLP

(57) ABSTRACT

The CPU of a face orientation detection apparatus which acquires an image frame photographed by a camera through a cable detects the face region in the horizontal direction of the acquired image frame by executing computer programs stored on a hard disk. Moreover, the CPU detects the eye position in the vertical direction from the image frame, and detects the nose position in the horizontal direction based on the detected eye position. Furthermore, the CPU detects the orientation of the face included in the image frame, based on the detected nose position and face region.

14 Claims, 14 Drawing Sheets

SUM OF BRIGHTNESS

SUM OF BRIGHTNESS

SUM OF BRIGHTNESS

FIG. 5A
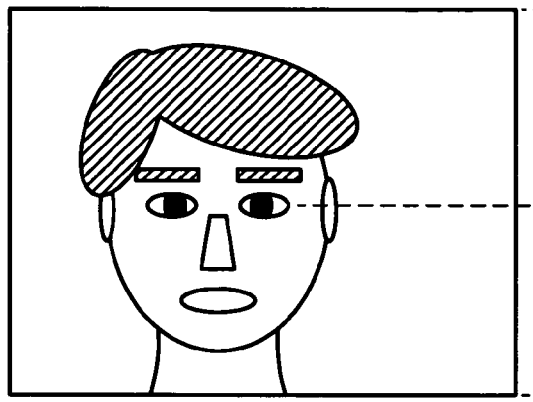
FIG. 5B
SUM OF BRIGHTNESS
FIG. 5C
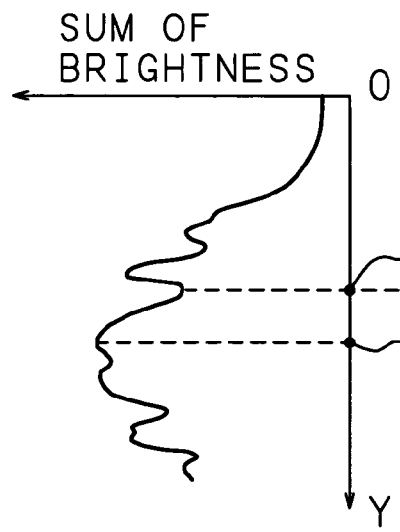
FIG. 5D
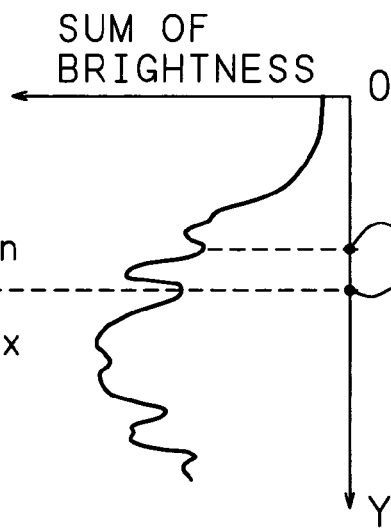

FIG. 7A
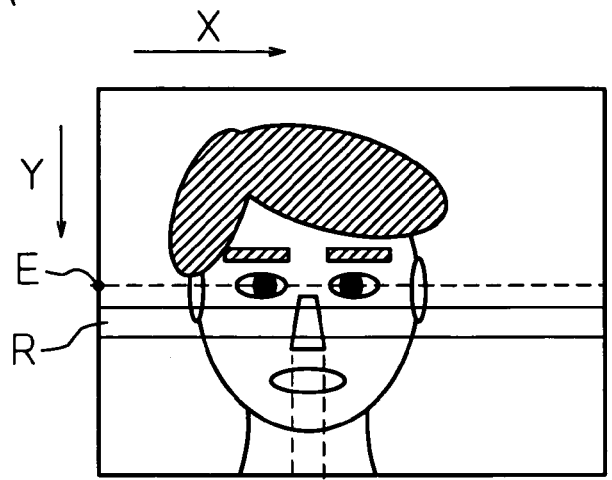
FIG. 7B
SUM OF BRIGHTNESS
O   Min₃   Min₄   X
FIG. 7C
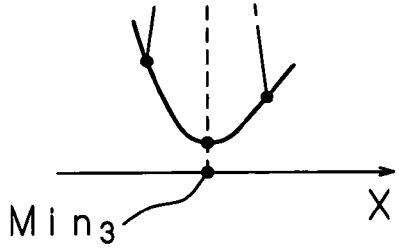
Min₃   X

FACE ORIENTATION DETECTION APPARATUS, FACE ORIENTATION DETECTION METHOD, AND COMPUTER MEMORY PRODUCT

BACKGROUND OF THE INVENTION

The present invention relates to a face orientation detection apparatus, a face orientation detection method and a computer memory product, for detecting the orientation of a face from image data acquired by photographing the face.

As an apparatus for assisting driving of a vehicle such an automobile, there has been proposed an apparatus for detecting the orientation of a driver's face based on image data obtained by photographing the face of the driver with a camera mounted in the vehicle at a position capable of photographing the face of the driver. With the use of such an apparatus, it is possible to detect inattentive driving from the orientation of the driver's face detected by the apparatus, and also possible to build a system for warning the driver of inattentive driving (see, for example, Japanese Patent Application Laid-Open No. 6-243367/1994).

However, it is often the case that an apparatus as mentioned above is constructed to determine the orientation of a driver's face by storing image data acquired by photographing the face of the driver in a plurality of orientations in advance, comparing these image data with image data sequentially acquired when the vehicle is running, and selecting image data of an orientation having a higher degree of correlation. In such a structure, since a plurality of pieces of image data acquired by photographing the face facing respective orientations need to be stored in advance, the memory capacity for storing the respective image data is very large. Moreover, since the image data with a high degree of correlation is selected for each piece of sequentially acquired image data, it takes a long time to determine the face orientation.

Furthermore, owing to the process for judging the face orientation based on the image data acquired by photographing a predetermined driver in advance, if another driver drives the vehicle, it is impossible to judge the face orientation. Besides, even when the same driver drives the vehicle, if the distance between the camera mounted in the vehicle and the driver as an object to be photographed differs from the distance when the image data was photographed, there is a difference in the size of the face region of the driver between these image data, and it is necessary to perform an enlargement or reducing process on the face region of sequentially acquired image data. Thus, such an apparatus suffers from the problem that it can not flexibly meet various conditions. Besides, since the apparatus of Japanese Patent Application Laid-Open No. 6-243367 (1994) is constructed to extract the tear ducts of both eyes and both ends of the lips from image data acquired by photographing the face of a driver and detect the orientation of the driver's face, based on the positional relationship among the extracted four points, if sequentially acquired image data does not include the lips of the driver, for example, there arises a problem that the apparatus can not detect the orientation of the driver's face.

BRIEF SUMMARY OF THE INVENTION

The present invention has been made with the aim of solving the above problem, and it is an object of the present invention to provide a face orientation detection apparatus, a face orientation detection method and a computer memory product, which detect the orientation of a face based on sum values in the vertical direction of image data acquired by photographing the face, and are thus capable of reducing the amount of data to be processed and shortening the processing time because the orientation of the face is detected by the process based on the calculated sum values.

Another object of the present invention is to provide a face orientation detection apparatus which uses a characteristic table storing characteristic data of the sum values of pixel data in the vertical direction of the image data of a plurality of face orientations acquired when the face was photographed in the respective orientations, extracts the characteristic data of sum values in the vertical direction of image data sequentially acquired by photographing the face, and selects and determines the face orientation corresponding to the extracted characteristic data, and is thus capable of reducing the memory capacity for storing data for use in the face orientation judging process because it is sufficient to store only the characteristic data in advance.

Still another object of the present invention is to provide a face orientation detection apparatus, a face orientation detection method and a computer memory product, which detect the eye position in the vertical direction based on sum values in the horizontal direction of image data acquired by photographing a face and detect the face orientation based on the sum values in the vertical direction in a vicinity region of the detected eye position, and are thus capable of reducing the amount of data to be processed and shortening the processing time because the face orientation is detected by the process based on the calculated sum values in the vicinity region of eyes for one piece of image data.

Yet another object of the present invention is to provide a face orientation detection apparatus, a face orientation detection method and a computer memory product, which detect the face region from image data acquired by photographing a face, detect the nose position in the horizontal direction from the image data, further detect the face orientation based on the detected nose position and face region, and are thus capable of accurately calculating not only the face orientation but also the face angle.

A further object of the present invention is to provide a face orientation detection apparatus which compares the sum value in the vertical direction of image data acquired by photographing a face and a threshold stored in advance, judges that pixel data calculated into the sum value is within the face region when the sum value is larger than the threshold, detects the face region based on this judgment result, and is thus capable of accurately specifying the face region in the horizontal direction and accurately detecting the face orientation based on the accurately detected face region and nose position.

A further object of the present invention is to provide a face orientation detection apparatus which calculates a variation in the horizontal direction of the sum values in the vertical direction of image data acquired by photographing a face, specifies the face outline in the horizontal direction based on the calculated variation, detects the face region based on the specified outline, and is thus capable of detecting the face region more accurately based on the specified outline.

A further object of the present invention is to provide a face orientation detection apparatus which detects the eye position in the vertical direction based on the sum values in the horizontal direction of image data acquired by photographing a face, specifies a local minimum value of the sum values in the vertical direction in a region located lower than the detected eye position by a preset predetermined number of pixels in the vertical direction, detects that a position in the horizontal direction of a sum value specified as the local minimum value is the nose position, and is thus capable of detecting the nose based on the pixel data in a region excluding a glasses frame.

A further object of the present invention is to provide a face orientation detection apparatus which, when a plurality of sum values in the vertical direction calculated for a region lower than eyes are specified as local minimum values, calculates the distance in the horizontal direction between these sum values, specifies the pixel data calculated into the sum values specified as the local minimum values as pixel data in the outline portion of the nose if the calculated distance is shorter than a preset predetermined distance, detects that the center portion in the horizontal direction of the two sum values separated by the calculated distance is the nose position, and is thus capable of accurately detecting the nose position.

According to a first aspect of the face orientation detection apparatus of the invention, there is provided an apparatus for detecting the orientation of a face from image data acquired by photographing the face, the image data being composed of a plurality of pixel data aligned in horizontal direction and vertical direction, respectively, characterized by comprising: vertical adding means for adding the respective pixel data in the vertical direction of the image data; and orientation detecting means for detecting a face orientation based on sum values calculated by the vertical adding means.

In the first aspect, since the respective pixel data in the vertical direction of the image data acquired by photographing the face are added and the face orientation is detected based on a plurality of sum values calculated, the face orientation is detected by the process based on the calculated sum values for one piece of image data, and consequently the amount of data to be processed is reduced, the processing time is shortened, and a speedy detection process is realized for sequentially acquired image data. Here, since the face region tends to be photographed more brightly compared to the hair region and the background region, if the face region and hair region, for example, the hair region can be specified based on the sum values obtained by adding the respective pixel data (for example, brightness values) in the vertical direction of the acquired image data, it is possible to detect the face orientation such as whether the face faces forward or sideward.

According to a second aspect of the invention, in the first aspect, the face orientation detection apparatus is characterized by comprising: extracting means for extracting characteristic data of sum values calculated by the vertical adding means; and a characteristic table storing the characteristic data in association with a plurality of face orientations, wherein the orientation detecting means comprises selecting means for selecting, from the characteristic table, a face orientation corresponding to the characteristic data extracted by the extracting means.

In the second aspect, by using the characteristic table that stores the characteristic data of sum values of pixel data in the vertical direction of image data of a plurality of face orientations when the face was photographed in the respective orientations, extracting the characteristic data of sum values in the vertical direction of image data sequentially acquired by photographing the face, and selecting and determining the face orientation corresponding to the extracted characteristic data from the characteristic table, it is sufficient to store only the above-mentioned characteristic data in advance and it is possible reduce the memory capacity for storing data for use in the face orientation judging process. Moreover, since the face orientation is detected by the process based on the characteristic data as described above, for example, even if an object to be photographed such as a driver differs or if the photographed image data does not include a part of the face, the face direction can be detected accurately based on the photographed image data.

According to a third aspect of the face orientation detection apparatus of the invention, there is provided an apparatus for detecting the orientation of a face from image data acquired by photographing the face, characterized by comprising: horizontal adding means for adding respective pixel data in the horizontal direction of the image data; eye detecting means for detecting an eye position in the vertical direction based on sum values calculated by the horizontal adding means; eye vicinity adding means for adding respective pixel data in the vertical direction in a vicinity region of the eye position detected by the eye detecting means; and orientation detecting means for detecting a face orientation based on the sum values calculated by the eye vicinity adding means.

In the third aspect, the respective pixel data in the horizontal direction of the image data acquired by photographing the face are added, and the eye position in the vertical direction is detected based on a plurality of sum values calculated. Moreover, by adding the pixel data in the vertical direction in the vicinity region of the detected eye position and detecting the face orientation based on a plurality of sum values calculated, the face orientation is detected by the process based on the sum values calculated in the vicinity region of eyes for one piece of image data, and consequently the amount of data to be processed is reduced and the processing time is shortened. Here, at the eye position in the vertical direction, the ear region and the hair region are often present, and the pixel data in the ear and hair regions tends to show a large change, and therefore it is possible specify the ear and hair regions based on the sum values calculated by the eye vicinity adding means in such a vicinity region of the eye position. For example, if the hair region can be specified, it is possible to detect the face orientation such as whether the face faces forward or sideward. Consequently, even if an object to be photographed such as a driver differs or if the photographed image data does not include a vicinity region of the mouth and nose, the face orientation can be detected accurately based on the image data including the eyes.

According to a fourth aspect of the invention, in the third aspect, the face orientation detection apparatus is characterized by comprising: maximum value specifying means for specifying a maximum value of the sum values calculated by the horizontal adding means; local minimum value specifying means for specifying a local minimum value of the sum values calculated by the horizontal adding means; and selecting means for selecting a sum value which is located higher in the vertical direction than a sum value specified as the maximum value by the maximum value specifying means and is specified as the local minimum value by the local minimum value specifying means, wherein the eye detecting means detects that a position in the vertical direction of the sum value selected by the selecting means is the eye position.

In the fourth aspect, the maximum value and local minimum value of a plurality of sum values obtained by adding the pixel data in the horizontal direction of the image data acquired by photographing the face are specified, and, when a position in the vertical direction of a sum value specified by the local minimum value which is located higher in the vertical direction than a sum value specified as the maximum value is detected as the eye position, for example, even if an object to be photographed such as a driver differs, the face orientation is detected by the process based on the sum values calculated by the eye vicinity calculating means in the vicinity region of eyes based on the specified eye position, and consequently the amount of data to be processed is reduced, the processing time is shortened, and the face orientation can be detected accurately. The reason for this is that, since the eye region tends to be photographed more darkly compared to the skin region and the cheek portion tends to be photographed most brightly in the face region, the sum value specified as the maximum value by the maximum value specifying means as described above is often the sum value of pixel data at the cheek position, and there is a high possibility that the sum value specified as the local minimum value and located higher in the vertical direction than the cheek position is the sum value of pixel data at the eye position.

According to a fifth aspect of the invention, in the third aspect, the face orientation detection apparatus is characterized by comprising: local minimum value specifying means for specifying a local minimum value of the sum values calculated by the horizontal adding means; and selecting means for selecting a sum value which is specified as the local minimum value by the local minimum value specifying means in the second highest position in the vertical direction of the sum values calculated by the horizontal adding means, wherein the eye detecting means detects that a position in the vertical direction of the sum value selected by the selecting means is the eye position.

In the fifth aspect, a plurality of local minimum values of sum values obtained by adding pixel data in the horizontal direction of the image data acquired by photographing the face are specified, and, when a position in the vertical direction of the second highest sum value of the image data among the sum values specified as the local minimum values is detected as the eye position, for example, even if an object to be photographed such as a driver differs or if the photographed image data does not include a vicinity region of the mouth and nose, the face orientation can be detected by the process based on the sum values calculated by the eye vicinity calculating means in the vicinity region of eyes based on the specified eye position. The reason for this is that, since the local minimum value at the highest position of image data among the specified local minimum values is often the sum value of pixel data at the eyebrow position, and the local minimum value at the second highest position is often the sum value of pixel data at the eye position.

According to a sixth aspect of the face orientation detection apparatus of the present invention, there is provided an apparatus for detecting the orientation of a face from image data acquired by photographing the face, characterized by comprising: region detecting means for detecting a face region in the horizontal direction from the image data; nose detecting means for detecting a nose position in the horizontal direction from the image data; and orientation detecting means for detecting a face orientation based on the nose position detected by the nose detecting means and the region detected by the region detecting means.

In the sixth aspect, by detecting the face region from the image data acquired by photographing the face, detecting the nose position in the horizontal direction from the image data and further detecting the face orientation based on the detected nose position and face region, it is possible to accurately detect not only the face orientation, but also the face angle.

According to a seventh aspect of the invention, in the sixth aspect, the face orientation detection apparatus is characterized by comprising: threshold storing means for storing thresholds; vertical adding means for adding the respective pixel data in the vertical direction of the image data; comparing means for comparing a sum value calculated by the vertical adding means and a threshold stored in the threshold storing means, wherein, when the sum value is larger than the threshold, the region detecting means judges that the pixel data calculated into the sum value are within the face region.

In the seventh aspect, a sum value in the vertical direction of the image data acquired by photographing the face and a threshold stored in the threshold storing means in advance are compared, and, when the sum value is larger than the threshold as a result of the comparison, the pixel data calculated into the sum value are judged to be within the face region, and the face region is detected based on this judgment result. Since the face region tends to be photographed more brightly compared to the background region, it is possible to accurately specify the face region based on the sum values calculated by the vertical calculating means and accurately detect the face orientation based on the accurately detected face region and nose position.

According to an eighth aspect of the invention, in the sixth aspect, the face orientation detection apparatus is characterized by comprising: vertical adding means for adding the respective pixel data in the vertical direction of the image data; variation calculating means for calculating a variation in the horizontal direction of the sum values calculated by the vertical adding means; and specifying means for specifying a face outline in the horizontal direction based on the variation calculated by the variation calculating means, wherein the region detecting means detects the face region based on the face outline specified by the specifying means.

In the eighth aspect, by calculating a variation in the horizontal direction of the sum values in the vertical direction of the image data acquired by photographing the face, specifying the face outline in the horizontal direction based on the calculated variation and detecting the face region based on the specified face outline, the pixel data at positions where the variation of the pixel data in the horizontal direction changes largely, such as a point of change from the background region to the face region and a point of change from the face region to the background region, can be specified as the pixel data in the outline portion of the face in the horizontal direction, and the face region can be detected more accurately based on the specified outline.

According to a ninth aspect of the invention, in any one of the sixth through eighth aspects, the face orientation detection apparatus is characterized by comprising: pixel number storing means for storing a predetermined number of pixels; horizontal adding means for adding the respective pixel data in the horizontal direction of the image data; eye detecting means for detecting an eye position in the vertical direction based on the sum values calculated by the horizontal adding means; under eye adding means for adding the pixel data in the vertical direction in a region located lower than the eye position detected by the eye detecting means by the number of pixels stored in the pixel number storing means; and local minimum value specifying means for specifying a local minimum value of the sum values calculated by the under eye adding means, wherein a position in the horizontal direction of the sum value specified as the local minimum value by the local minimum value specifying means is detected as a nose position.

In the ninth aspect, the eye position in the vertical direction is detected based on the sum values in the horizontal direction of the image data acquired by photographing the face, and sum values of pixel data in the vertical direction are calculated in a region located lower than the detected eye position by the preset predetermined number of pixels. Moreover, by specifying the local minimum value of the calculated sum values and detecting that a position in the horizontal direction of the sum value specified as the local minimum value is the nose position, the nose position can be detected by a simple process. Here, since the outline portion of the nose tends to be photographed darkly in the face region, the sum value specified as the local minimum value is often the image data in the outline portion of the nose, and the nose position can be detected accurately based on the sum value specified as the local minimum value in the above-mentioned manner. Further, by detecting the nose based on the pixel data in the region located lower than the eye position by the predetermined number of pixels, even if the image data includes a glasses frame, it is possible to detect the nose based on the pixel data in the region excluding the glasses frame, thereby detecting the nose without being influenced by the glasses frame.

According to a tenth aspect of the invention, in the ninth aspect, the face orientation detection apparatus is characterized by comprising: distance storing means for storing a predetermined distance; distance calculating means for, when a plurality of local minimum values are specified by the local minimum value specifying means, calculating a distance in the horizontal direction between sum values specified as the local minimum values; and comparing means for comparing the distance calculated by the distance calculating means and the predetermined distance stored in the distance storing means, wherein, when the distance calculated by the distance calculating means is shorter than the predetermined distance, a center portion in the horizontal direction of the two sum values separated by the distance is detected as the nose position.

In the tenth aspect, when a plurality of sum values are specified local minimum values among sum values in the vertical direction calculated for the under eye region, the distance in the horizontal direction between these sum values is calculated. When the calculated distance is shorter than the preset predetermined distance, the pixel data calculated into the sum values specified as the local minimum values can be specified as the pixel data in the outline portion of the nose, and the nose position can be detected accurately by detecting the center portion in the horizontal direction of the two sum values separated by the distance as the nose position.

The above and further objects and features of the invention will more fully be apparent from the following detailed description with accompanying drawings.

BRIEF DESCRIPTION OF THE SEVERAL VIEWS OF THE DRAWINGS

FIGS. 5A through 5D are views for explaining the eye position detection process performed by the face orientation detection apparatus;

FIGS. 7A through 7C are views for explaining the nose position detection process performed by the face orientation detection apparatus;

FIGS. 13A through 13D are views for explaining the face orientation detection process performed by the face orientation detection apparatus.

DETAILED DESCRIPTION OF THE INVENTION

The following description will explain a face orientation detection apparatus of the present invention in detail, based on the drawings illustrating an embodiment thereof. The face orientation detection apparatus of this embodiment is constructed to detect the orientation of a driver's face, for example, based on an image photographed by a camera (imaging device) mounted in a position capable of photographing the face of the driver on a vehicle such as an automobile. Note that the camera can be mounted, for example, near the mount position of a mirror or steering wheel, and acquires, for example, 30 image frames (image data) per second.

Figure 1:
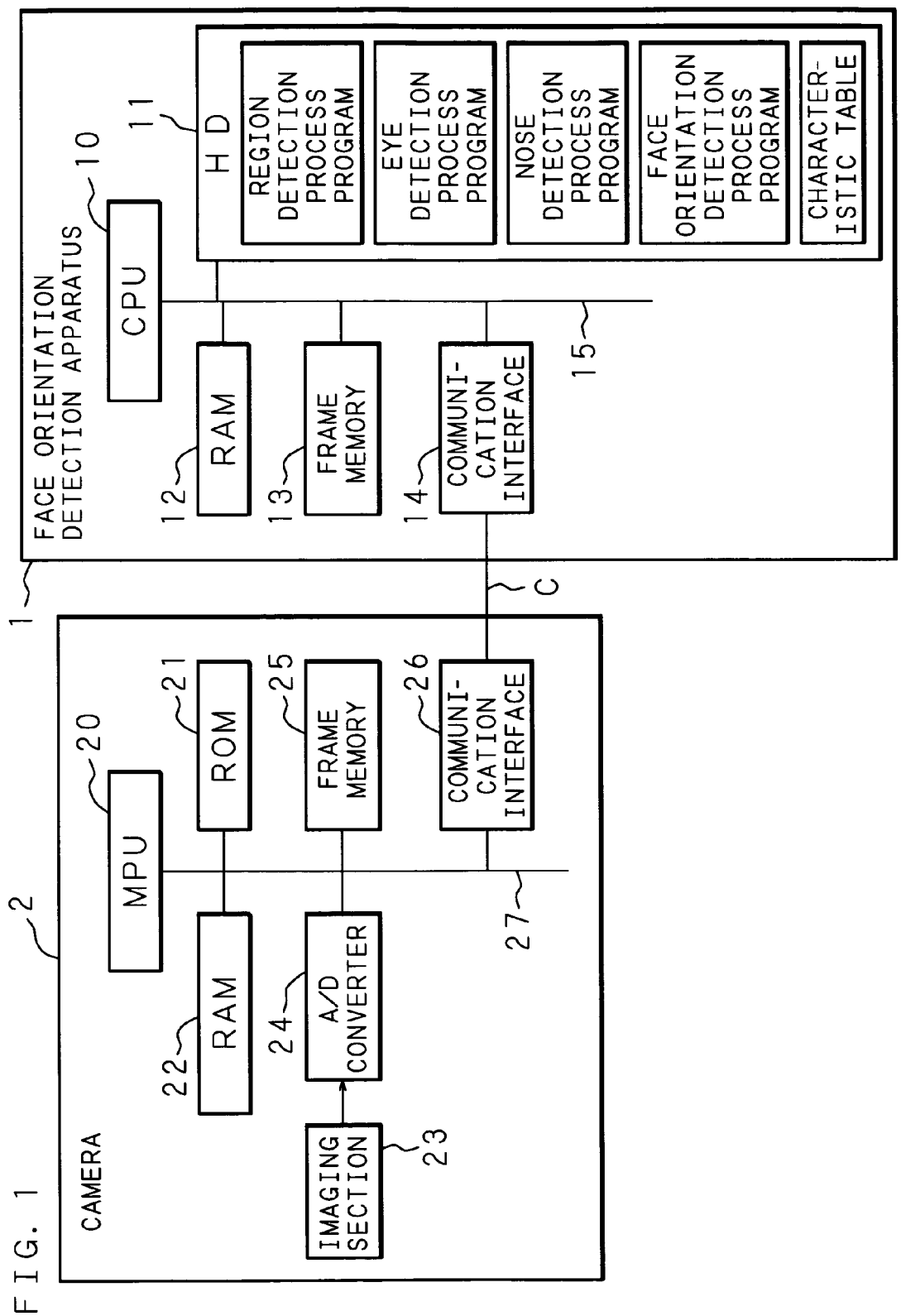
FIG. 1 is a block diagram showing an example of the configuration of a face orientation detection apparatus of the present invention.

FIG. 1 is a block diagram showing an example of the configuration of the face orientation detection apparatus of the present invention. In FIG. 1, numeral 1 represents the face orientation detection apparatus of the present invention, and this face orientation detection apparatus 1 is connected to a camera 2 through a cable C. Although the camera 2 and the face orientation detection apparatus 1 are connected with the cable C for exclusive use, it is also possible to connect them through a network such as a LAN (Local Area Network) in the vehicle.

The camera 2 controls the operations of the following hardware sections connected through a bus 27 to an MPU (Micro Processor Unit) 20 as a control center. Connected to the bus 27 are a ROM 21 storing computer programs showing the control procedure for the MPU 20; a RAM 22 for storing temporarily various data generated during control operation performed by the MPU 20; an imaging section 23 having a CCD (Charge Coupled Device); an A/D (Analog/Digital) converter 24 for converting an analog image frame acquired by the imaging section 23 into a digital image frame; a frame memory 25 composed of a RAM for storing temporarily the digital image frame converted by the A/D converter 24; and a communication interface 26 for performing data transmission through the cable C.

The MPU 20 controls the above-mentioned various hardware sections through the bus 27 while measuring a predetermined timing by clock means (not shown) installed therein, and sequentially executes various computer programs necessary for the operation of the camera 2, stored in the ROM 21. Besides, the A/D converter 24 of this embodiment converts analog image frames sequentially inputted from the imaging section 23 into digital image frames in which each pixel is represented by, for example, 256 gray levels (1 byte).

The camera 2 with the above-mentioned structure captures an image frame with a predetermined timing using the imaging section 23, and the captured image frame is converted into a monochrome digital image frame by the A/D converter 24, temporarily stored in the frame memory 25, and inputted into the face orientation detection apparatus 1 through the communication interface 26. Note that it is also possible to use a camera for acquiring color image frames.

The face orientation detection apparatus 1 comprises a CPU (Central Processing Unit) 10 as a control center; a hard disk 11 (hereinafter referred to as HD) storing computer programs showing the control procedure for the CPU 10; a RAM 12 for storing temporarily various data generated during control operation performed by the CPU 10; a frame memory 13 composed of a RAM or the like for storing temporarily an image frame acquired through the cable C; and a communication interface 14 for performing data transmission through the cable C.

The CPU 10 comprises clock means (not shown), controls the above-mentioned various hardware sections through a bus 15 while measuring timing, and sequentially executes computer programs stored in the HD 11. Moreover, the CPU 10 comprises an eye undetectable flag register which is turned on when eyes can not be detected by an eye detection process performed by the CPU 10, and a nose undetectable flag register which is turned on when a nose can not be detected by a nose detection process.

The HD 11 stores a region detection process program for detecting the face region of the driver included in the image frame acquired from the camera 2 through the cable C by the face orientation detection apparatus 1; an eye detection process program for detecting the eye position of the driver; a nose detection process program for detecting the nose position of the driver; a face orientation detection process program for detecting the orientation of the driver's face; and a characteristic table for use in the face orientation detection process. Further, the HD 11 stores various thresholds for use in the respective processes, more specifically, a predetermined brightness value, a predetermined number of pixels and a predetermined distance, and the HD 11 also functions as threshold storing means, pixel number storing means and distance storing means.

Figure 2:
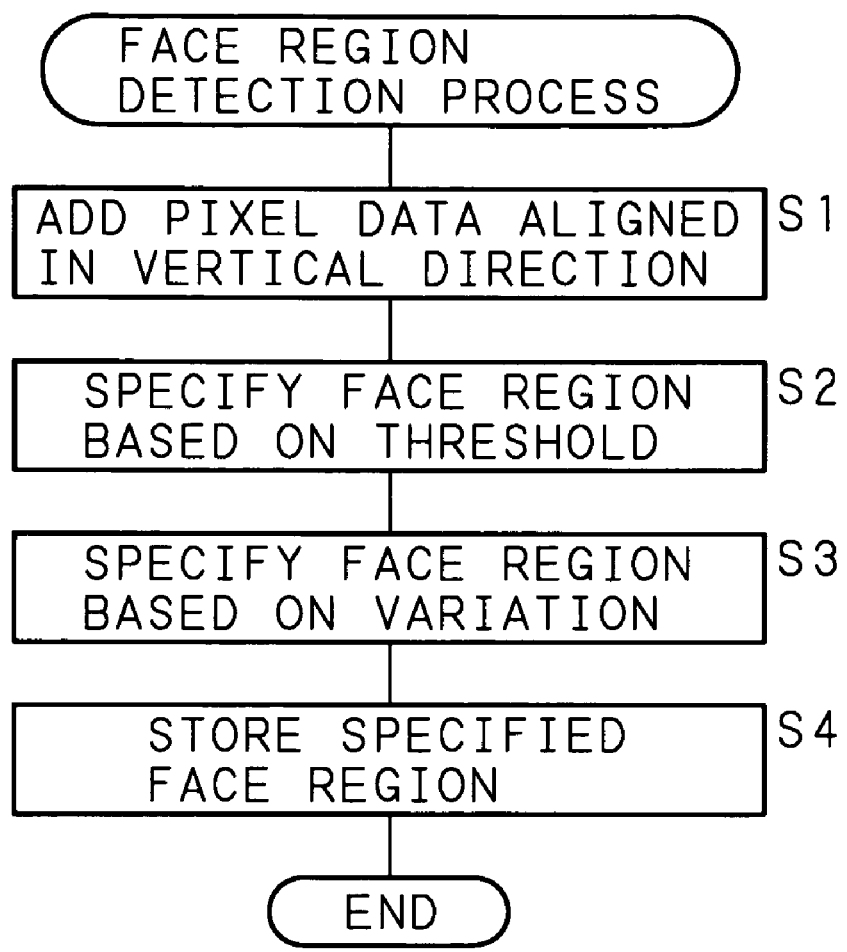
FIG. 2 is a flowchart showing the procedure of a face region detection process performed by the face orientation detection apparatus.

In the face detection apparatus 1 with the above-mentioned configuration, the CPU 10 reads the region detection process program stored in the HD 11 into the RAM 12 and sequentially executes the program, and thereby detects the face region in the horizontal direction of the driver included in an image frame acquired from the camera 2, based on the image frame. FIG. 2 is a flowchart showing the procedure of the face region detection process performed by the face orientation detection apparatus 1. By executing the region detection process program stored in the HD 11, the CPU 10 operates as vertical adding means for adding respective pixel data aligned next to each other in the vertical direction of the image frame, and sequentially adds the pixel data aligned in the vertical direction of the image frame acquired from the camera 2 (S1).

Figure 3A:
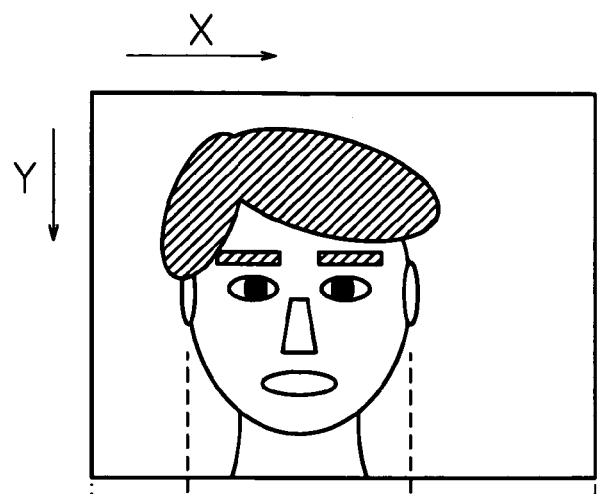
FIGS. 3A through 3D are views for explaining the face region detection process performed by the face orientation detection apparatus.

FIGS. 3A through 3D are views for explaining the face region detection process performed by the face orientation detection apparatus 1. FIG. 3A shows an example of the image frame acquired from the camera 2. In FIG. 3A, X represents the horizontal direction of the image frame, while Y represents the vertical direction of the image frame, and the image frame comprises a plurality of pixel data aligned in the horizontal direction X and the vertical direction Y, respectively.

Figure 3B:

By sequentially adding the pixel data aligned in the vertical direction Y of the image frame, the CPU 10 calculates a graph as shown in FIG. 3B. In the graph of FIG. 3B, the abscissa shows the horizontal direction X, while the ordinate shows the calculated sum value, more specifically the sum of brightness. Here, since the face region tends to be photographed more brightly compared to the hair region and the background region, it is possible to specify the face region based on the sum of brightness calculated as described above. The CPU 10 of this embodiment uses a predetermined brightness value as a preset threshold in the HD 11, and, when the sum of brightness calculated as described above is larger than the predetermined brightness value, the CPU 10 judges that the pixel data calculated into the sum of brightness is image data within the face region, and specifies the face region (S2).

Figure 3C:
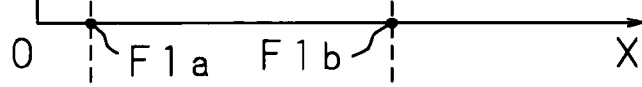

More specifically, the CPU 10 operates as comparing means for comparing the sum of brightness calculated as described above and the predetermined brightness value, and a region with larger sum of brightness than the predetermined brightness value as a result of the comparison of the calculated sum of brightness and the predetermined brightness value, for example, a region indicated by F1 in FIG. 3C can be specified as the face region. Note that, F1a in FIG. 3C indicates the left end position of the face region, and F1b indicates the right end position of the face region.

Besides, since the pixel data in the horizontal direction of the image frame tends to change more largely at a change point from the background region to the face region and a change point from the face region to the background region than other points, it is also possible to detect the face region based on the variation of the sum of brightness calculated as described above. Thus, for the sum of brightness calculated as described above, the CPU 10 operates as variation calculating means for calculating the variation between a predetermined number of pixels in the horizontal direction on the left and right sides of the sum of brightness of each position in the horizontal direction X, and operates as specifying means for specifying a position where there is a large change in the variation respectively calculated, for example, a position indicated by F2a in FIG. 3D, as an outline portion of the face in the horizontal direction X and specifies the face region with this position as the left end position of the face region (S3).

Figure 3D:
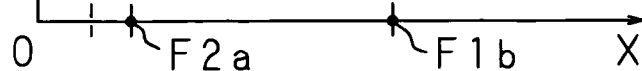

Note that, in FIG. 3D, the right end position of the face region is not specified by a process of specifying the face region based on the variation. In such a case, as shown in FIG. 3C, the face region is specified by determining that the right end position F1b specified based on the predetermined brightness value is the right end position of the face region, and the CPU 10 stores the specified face region in the RAM 12 (S4) and terminates the face region detection process.

Figure 4:
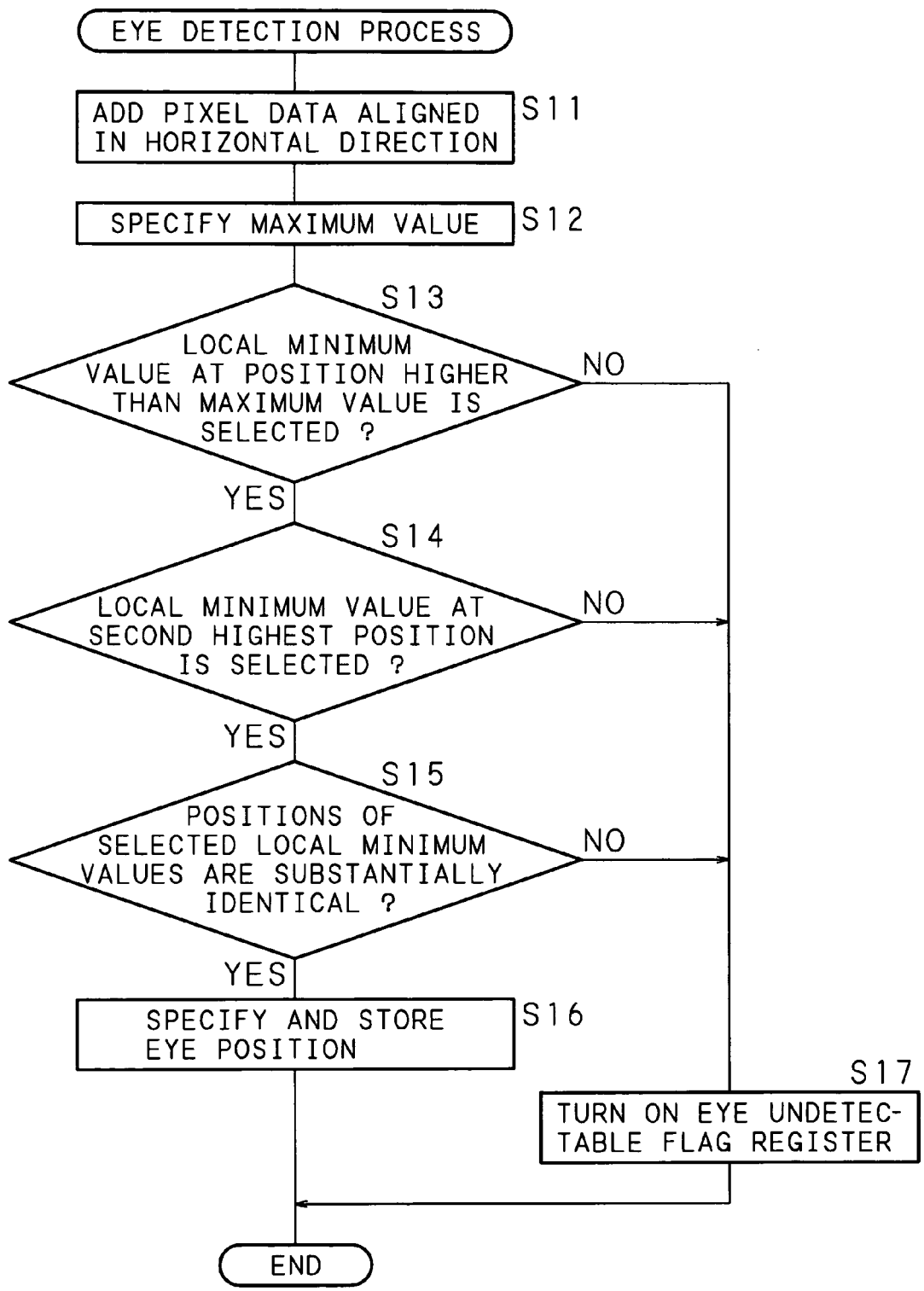
FIG. 4 is a flowchart showing the procedure of an eye position detection process performed by the face orientation detection apparatus.

Next, by reading the eye detection process program stored in the HD 11 into the RAM 12 and sequentially executing the program, the CPU 10 detects the eye position in the perpendicular direction of the driver included in the image frame acquired from the camera 2. FIG. 4 is a flowchart showing the procedure of the eye position detection process performed by the face orientation detection apparatus 1. By executing the eye detection process program stored in the HD 11, the CPU 10 operates as horizontal adding means for adding pixel data aligned next to each other in the horizontal direction of the image frame, and sequentially adds the pixel data aligned in the horizontal direction of the image frame acquired from the camera 2 (S11).

FIGS. 5A through 5D are views for explaining the eye position detection process performed by the face orientation detection apparatus 1, and, similarly to FIG. 3A, FIG. 5A shows an example of the image frame acquired from the camera 2. By sequentially adding the pixel data aligned in the horizontal direction X of the image frame, the CPU 10 calculates a graph as shown in FIG. 5B. In the graph of FIG. 5B, the ordinate shows the vertical direction Y, and the abscissa shows the calculated sum of brightness.

The CPU 10 also operates as maximum value specifying means for specifying the maximum value of the sum of brightness calculated as described above, and specifies the maximum value (S12). Here, in the face region, since the cheek portion tends to be photographed most brightly, the sum of brightness specified as the maximum value can be judged to be the sum value of the pixel data in the cheek position, and a position in the vertical direction Y indicated by Max in the graph of FIG. 5C can be specified as the cheek position as mentioned above.

The CPU 10 also operates as local minimum value specifying means for specifying the local minimum value of the sum of brightness calculated as described above, and operates as selecting means for selecting the sum of brightness to be the local minimum value at a position higher in the vertical direction Y than the sum of brightness specified as the maximum value in step S12 and thereby has the structure of selecting the sum of brightness to be the local minimum value at a position higher in the vertical direction Y than the sum of brightness specified as the maximum value, and judges whether or not such sum of brightness is selected by itself (S13). Since the eye region tends to be photographed more darkly compared to the skin region, there is a high possibility that the sum of brightness which is located higher in the vertical direction Y than the cheek position indicated by the position of the sum of the brightness as the maximum value and is specified as the local minimum value is the sum value of the pixel data in the eye position, and therefore a position selected in such a manner and indicated by Min in the graph of FIG. 5C can be a candidate for the eye position.

As described above, when the sum of brightness to be the local minimum value at a position higher in the vertical direction Y than the sum of the brightness as the maximum value is selected (S13: YES), the CPU 10 sequentially detects the sums of brightness to be local minimum values from the higher position in the vertical direction Y in the image frame, selects the sum of brightness to be a local minimum value in the second highest position, and judges whether or not such sum of brightness is detected (S14). Similarly to the eye region, since the eyebrow region tends to be photographed more darkly compared to the skin region, a position $Min_1$ in FIG. 5D indicates the position of the local minimum value at the highest position in the vertical direction Y of the image data, and this local minimum value can be judged to be the sum value of the pixel data in the eyebrow position, while the position of the local minimum value at the second highest position can be judged to be the sum value of the pixel data in the eye position, and thus a position $Min_2$ of the local minimum value at the second highest position can be candidate for the eye position.

When the local minimum value of the sum of brightness at the second highest position in the vertical direction Y is detected (S14: YES), the CPU 10 compares the positions of the local minimum values selected in steps S13 and S14 as mentioned above, and judges whether or not the positions Min and $Min_2$ of the two local minimum values are substantially identical (S15). If these positions are substantially identical (S15: YES), the CPU 10 specifies the position of the selected local minimum value as the eye position and stores it in the RAM 12 (S16). On the other hand, when a corresponding local minimum value is not selected in step S13 or S14 (S13: NO, S14: NO), and when the positions Min and $Min_2$ of the selected two local minimum values are not substantially identical in step S15 (S15: NO), the CPU 10 turns on the eye undetectable flag register stored therein (S17), and terminates the eye detection process.

Next, by reading the nose detection process program stored in the HD 11 into the RAM 12 and sequentially executing the program, the CPU 10 detects the nose position in the horizontal direction of the driver included in the image frame acquired from the camera 2. Note that the CPU 10 executes this nose detection process program only when the eye position is detected by the execution of the above-mentioned eye detection process program.

Figure 6:
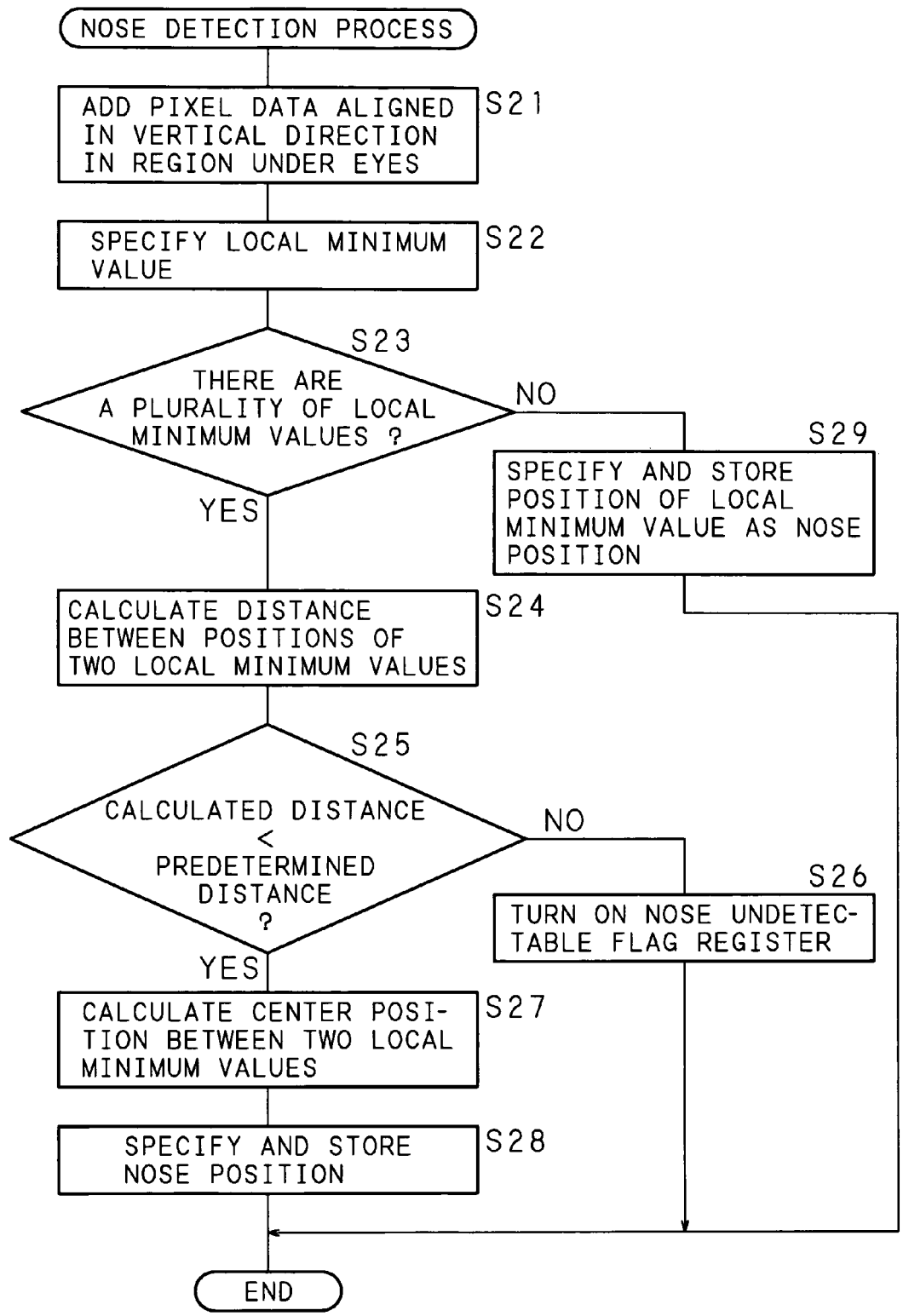
FIG. 6 is a flowchart showing the procedure of a nose position detection process performed by the face orientation detection apparatus.

FIG. 6 is a flowchart showing the procedure of the nose position detection process performed by the face orientation detection apparatus 1. FIGS. 7A through 7C are views for explaining the nose position detection process performed by the face orientation detection apparatus 1. By executing the nose detection process program stored in the HD 11, the CPU 10 operates as under eye adding means for adding the pixel data aligned next to each other in the vertical direction in a region R which is lower in the vertical direction Y by a predetermined number of pixels pre-stored in the HD 11 than an eye position E detected by the above-mentioned eye position detection process, and sequentially adds the pixel data aligned in the vertical direction in this region R under eyes (S21) and calculates a graph as shown in FIG. 7B. Similarly to FIG. 3A, FIG. 7A shows an example of the image frame acquired from the camera 2. In the graph of FIG. 7B, the abscissa shows the horizontal direction X, and the ordinate shows the calculated sum of brightness.

Next, the CPU 10 specifies the local minimum value of the sum of brightness calculated as described above (S22). Here, since the outline portion of the nose tends to be photographed darkly in the face region, the sum of brightness specified as the local minimum value in this manner can be specified as the sum value of image data in the outline portion of the nose, and the positions of local minimum values indicated by $Min_3$ and $Min_4$ in the horizontal direction X in the graph of FIG. 7B can be specified as the left and right outline positions of nose.

FIG. 7C is an enlarged view of the vicinity of the position $Min_3$ in the horizontal direction X of FIG. 7B. As shown in FIG. 7C, the sum of brightness in the focused position $Min_3$ in the horizontal direction X is the local minimum value of the sum of brightness which is the smallest value between a predetermine number of pixels in the left and right of the horizontal direction X. The CPU 10 judges whether or not there are a plurality of local minimum values specified as described above (S23). When there are a plurality of local minimum values (S23: YES), the CPU 10 operates as distance calculating means for calculating the distance between the positions of two local minimum values in the horizontal direction X and calculates the distance (S24), and then judges whether or not the calculated distance is shorter than a predetermined distance pre-stored in the HD 11 (S25).

The above-calculated distance in the horizontal direction X between the positions $Min_3$ and $Min_4$ of local minimum values specified as the outline positions of nose indicates the width of nose, and, when this width is longer than the predetermined distance (S25: NO), the CPU 10 judges that the nose position can not be detected and turns on the nose undetectable flag register installed therein (S26), and terminates the nose detection process.

On the other hand, when the distance in the horizontal direction X between the two local minimum values is shorter than the predetermined distance (S25: YES), the CPU 10 judges that the local minimum values $Min_3$ and $Min_4$ separated by this distance are the sum values of image data in the outline positions of nose and calculates the center position between these local minimum values $Min_3$ and $Min_4$ (S27), and then specifies the calculated center position as the nose position and stores it in the RAM 12 (S28). On the other hand, in step S23, when there is not a plurality of specified local minimum values (S23: NO), i.e., when the left and right outline portions of nose are not accurately included in the image frame, the CPU 10 specifies the position in the horizontal direction X of the sum of brightness which is specified as the local minimum value in step S22 as the nose position and stores it in the RAM 12 (S29).

Figure 8A:
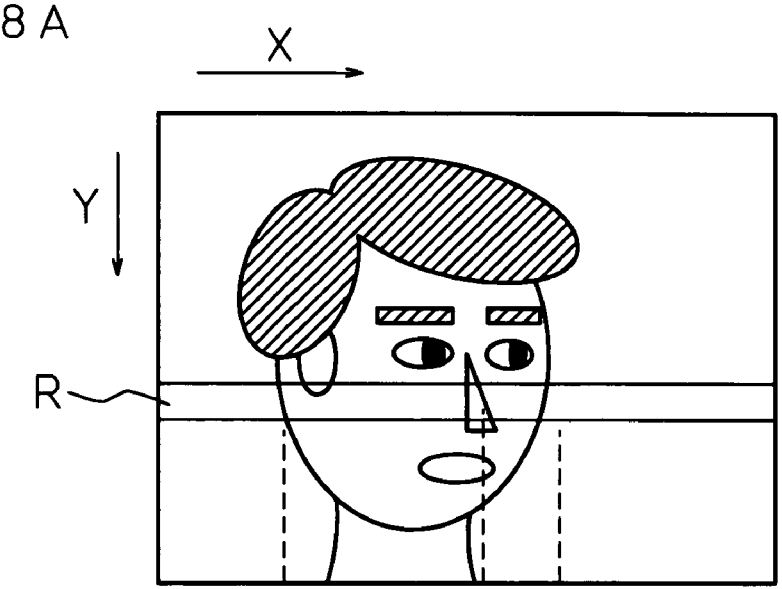
FIGS. 8A and 8B are views for explaining the nose position detection process performed by the face orientation detection apparatus.
Figure 8B:
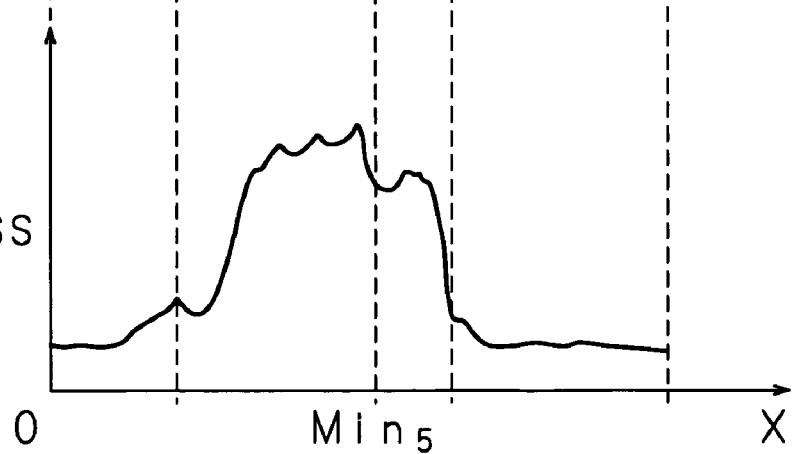

FIGS. 8A and 8B are views for explaining the nose position detection process performed by the face orientation detection apparatus 1 when the outline portions of nose are not accurately photographed. As shown in FIG. 8A, there is a case where the left and right outline portions of nose can not be accurately photographed due to the face orientation of a driver to be photographed. In such a case, a position $Min_5$ in the horizontal direction X of the sum of brightness that is one local minimum value specified in the above-described step S22 is specified as the nose position.

Figure 9:
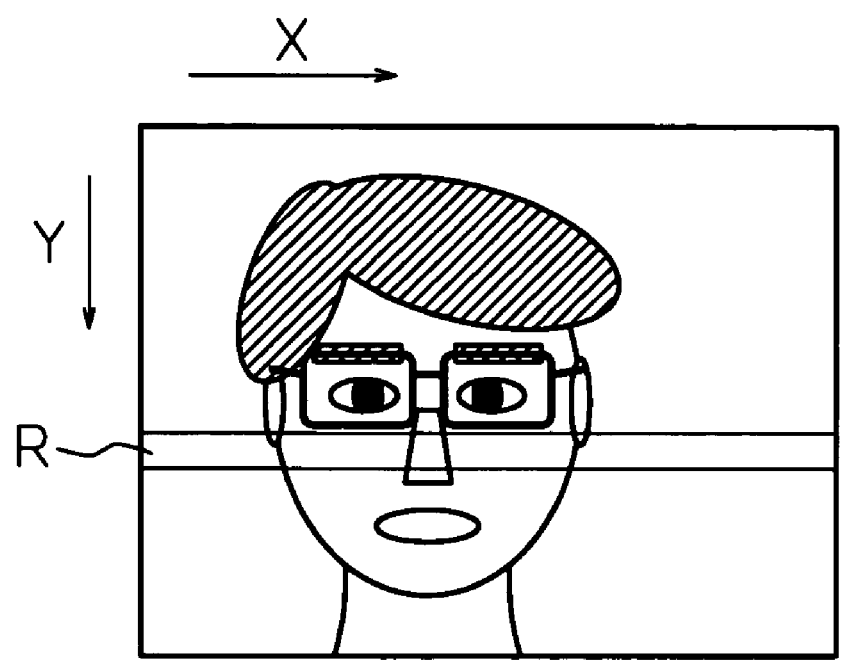
FIG. 9 is a view showing an image frame including a glasses frame.

FIG. 9 is a view showing an image frame including a glasses frame. As described above, by detecting the nose position based on the image data in the region R located lower than the detected eye position by the predetermined number of pixels as shown in FIG. 9, for example, even in the image frame including a glasses frame, the nose position can be detected without being influenced by the glasses frame, based on the pixel data in the region R excluding the glasses frame.

Figure 10:
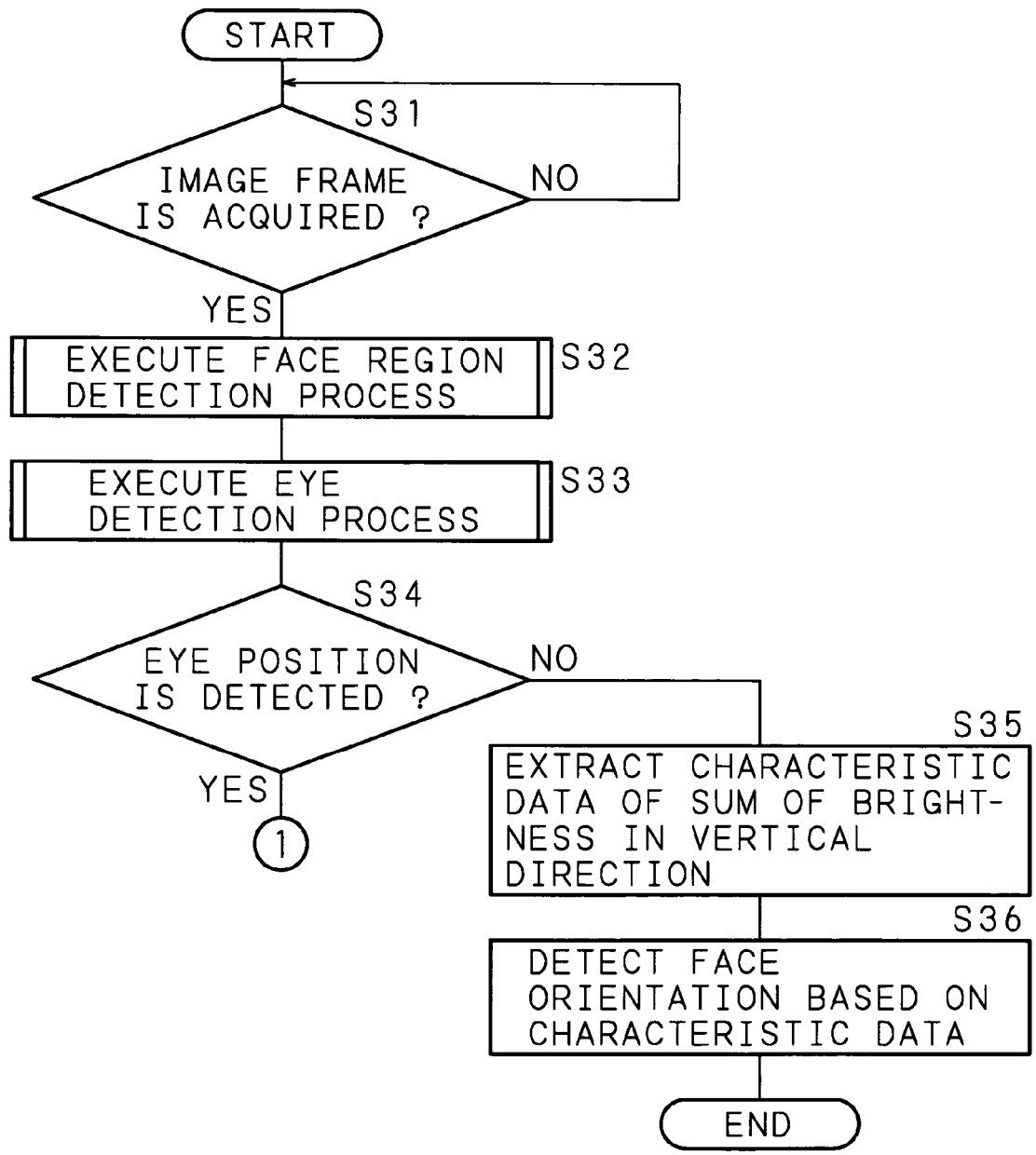
FIG. 10 is a flowchart showing the procedure of a face orientation detection process performed by the face orientation detection apparatus.
Figure 11:
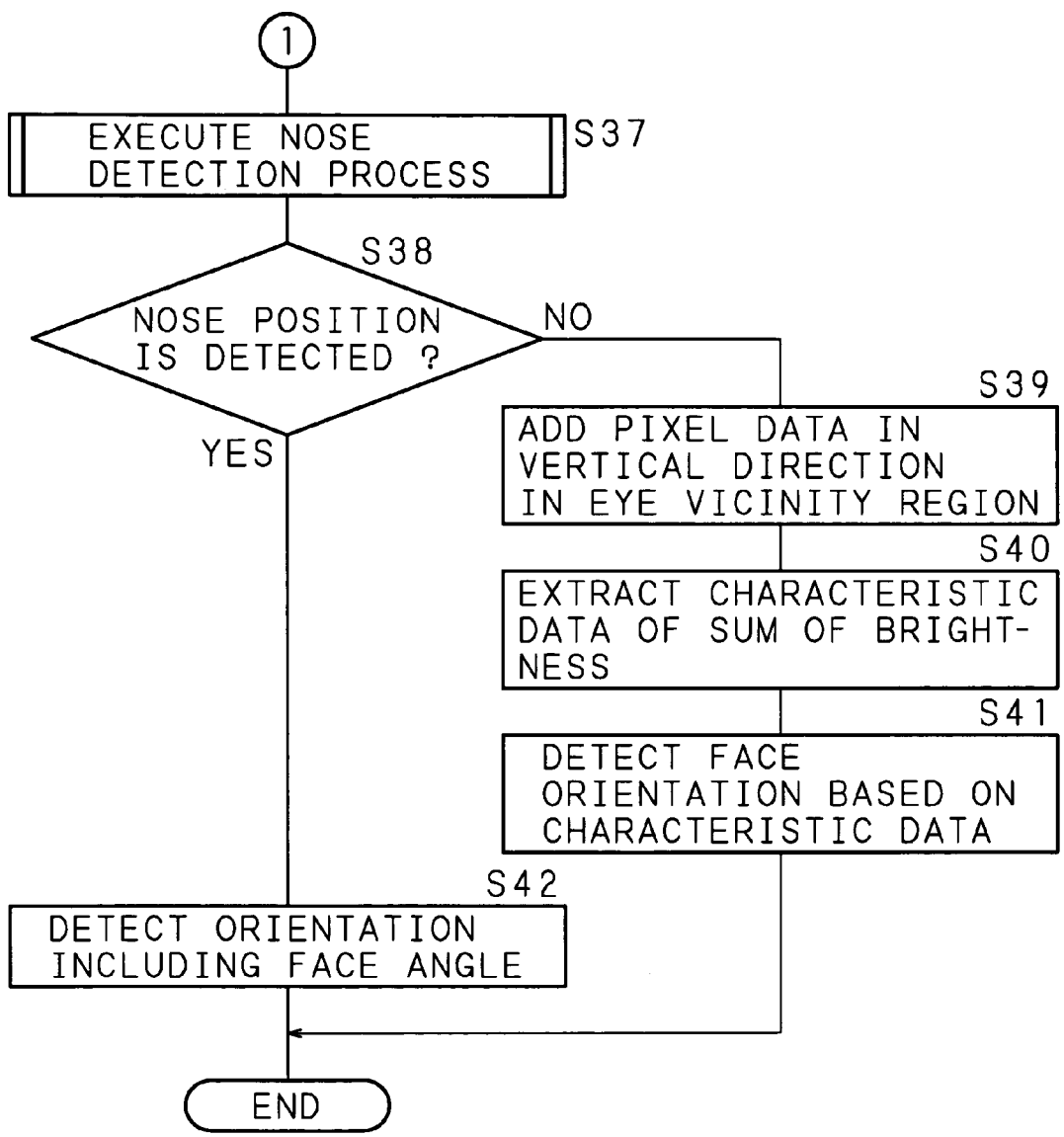
FIG. 11 is a flowchart showing the procedure of a face orientation detection process performed by the face orientation detection apparatus.

The following description will explain how the face orientation detection apparatus 1 for performing the above-described face region detection process, eye detection process, and nose detection process to perform a detection process for detecting the face orientation of the driver of a vehicle from an image frame acquired from the camera 2. FIGS. 10 and 11 show a flowchart of the procedure of the face orientation detection process performed by the face orientation detection apparatus 1 of the present invention.

In the face orientation detection apparatus 1, the CPU 10 judges whether or not an image frame has been acquired from the camera 2 (S31). When an image frame has not been acquired from the camera 2 (S31: NO), the CPU 10 waits until an image frame has been acquired, and, when an image frame has been acquired (S31: YES), the CPU 10 operates as region detecting means by executing the region detection process program in the HD 11, and executes the face region detection process explained by the flowchart of FIG. 2 for the acquired image frame (S32) and specifies the face region of the driver included in the image frame.

Next, the CPU 10 operates as eye detecting means by executing the eye detection process program in the HD 11, and executes the eye detection process explained by the flowchart of FIG. 4 for the acquired image frame (S33) and specifies the eye position of the driver included in the image frame. Note that in the eye detection process of this embodiment, as described above, since there is a case where the eye position can not be detected due to an image frame captured by the camera 2, the CPU 10 judges whether or not the eye position can be detected by the above-described eye detection process, based on whether or not the eye undetectable flag register installed therein is turned off (S34).

Figure 12A:
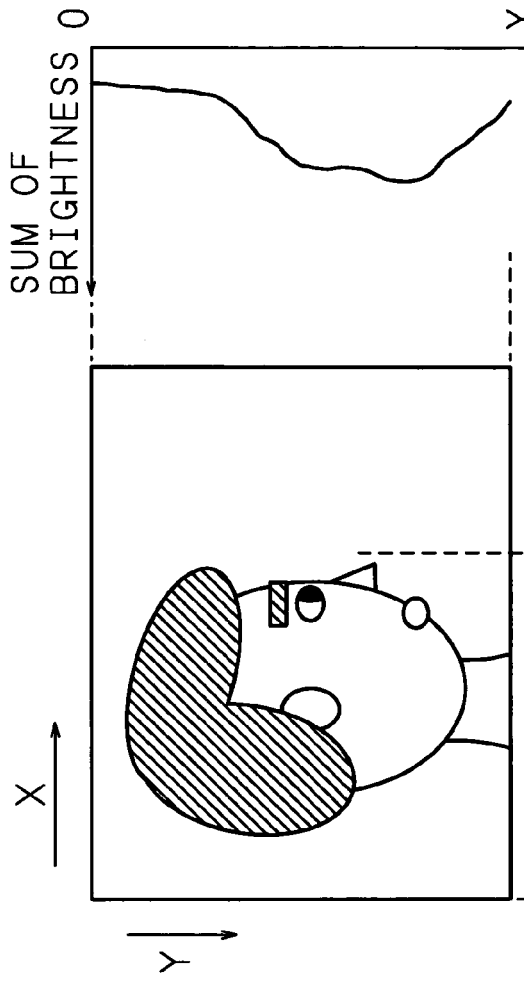
FIGS. 12A through 12C are views for explaining the face orientation detection process performed by the face orientation detection apparatus.
Figure 12B:
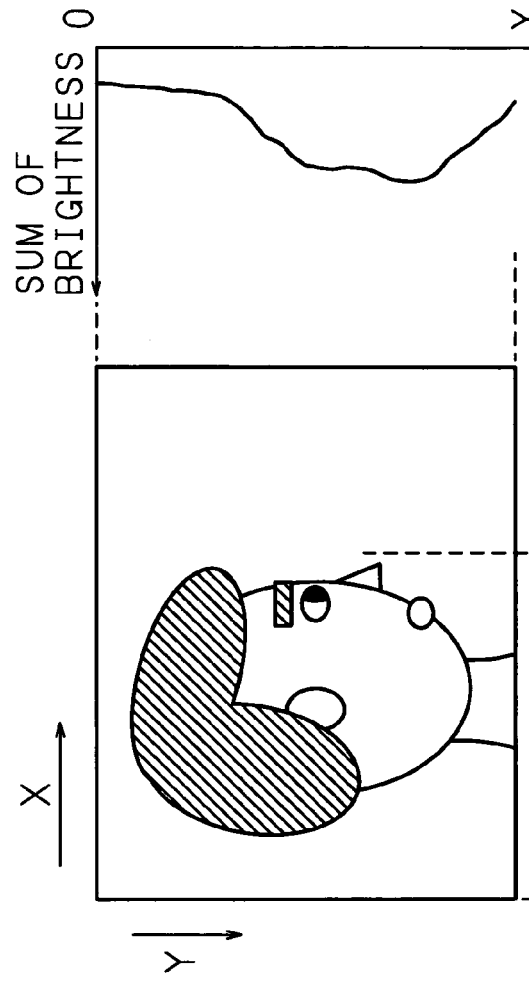
Figure 12C:
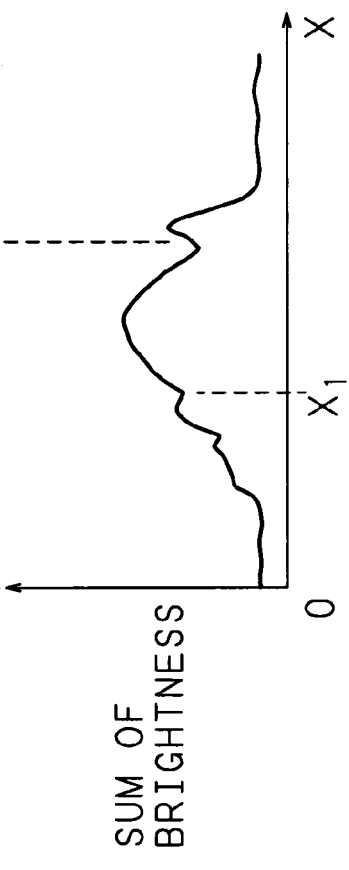

FIGS. 12A through 12C are views for explaining the face orientation detection process performed by the face orientation detection apparatus 1, for an image frame from which the eye position can not be detected. Similarly to FIG. 3A, FIG. 12A shows an example of the image frame acquired from the camera 2. One example of the image frame from which the eye position can not be detected is an image frame in which the local minimum value of the sum of brightness, which is the sum value of pixel data aligned in the horizontal direction X of the image frame calculated in the above-described eye detection process, can not be specified.

Thus, when the eye position can not be detected (S34: NO), the CPU 10 operates as extracting means for extracting characteristic data of the sum of brightness that is the sum value of pixel data aligned in the vertical direction Y of the image frame calculated by the above-described face region detection process in step S32 (S35) Here, FIG. 12C shows a graph of the sum of brightness of pixel data aligned in the vertical direction Y of the image frame, the characteristic data includes data indicating the characteristic that each sum of brightness increases moderately as shown in a range of the left end to position $X_1$ in the horizontal direction X, and the characteristic table pre-stored in the HD 11 stores data indicating characteristics as mentioned above extracted from the image frames photographed in directions corresponding to the respective orientations of the face.

More specifically, in FIG. 12C, in the horizontal direction X as described above, each sum of brightness increases moderately, and there is a small change in the sum of brightness. There is often the case that such an image frame represents the region of long hair, and such characteristic data is stored in the characteristic table in association with the orientation facing right, and the CPU 10 operates as orientation detecting means based on the extracted characteristic data and detects the face orientation from the characteristic table in the HD 11 (S36). In FIG. 12C, it is specified that the face faces right. Note that such characteristic data stored in the characteristic table can be stored in the HD 11 in advance, but the user can also set to add the characteristic data to the RAM 12.

On the other hand, in step S34, when the eye position is detected (S34: YES), the CPU 10 executes the nose detection process explained by the flowchart of FIG. 6 (S37), and specifies the nose position of the driver included in the image frame. Similarly to the eye detection process, in the nose detection process, since there is a case that the nose position can not be detected due to an image frame captured by the camera 2, the CPU 10 judges whether or not the nose position has been detected by the above-described nose detection process, based on whether or not the nose undetectable flag register installed therein is turned off (S38).

Figure 13A:
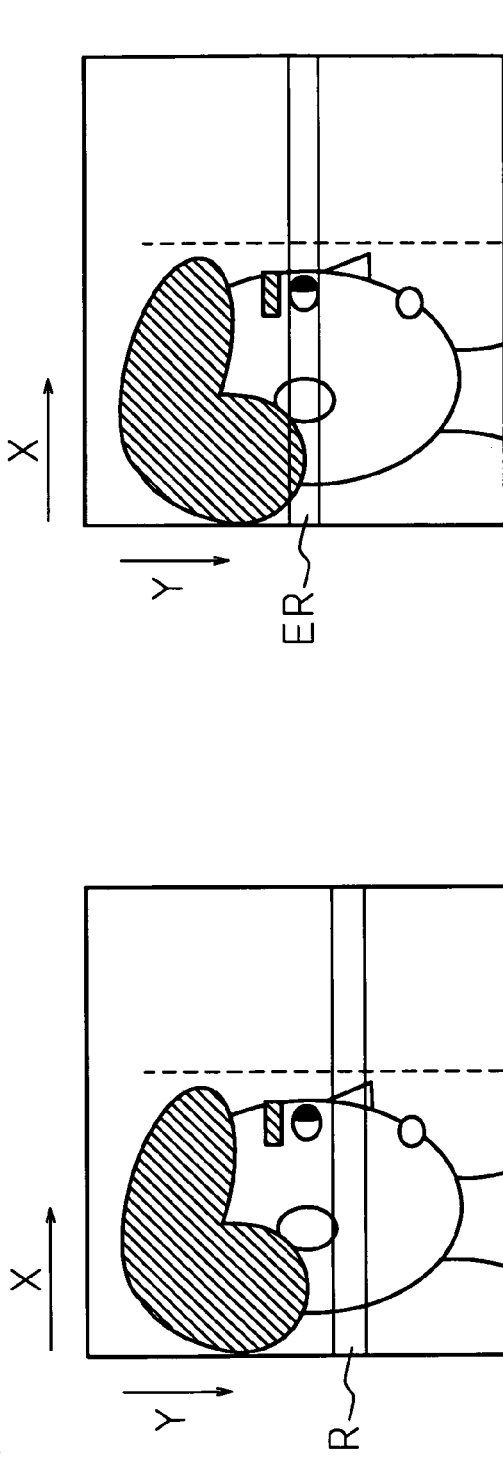
Figure 13B:
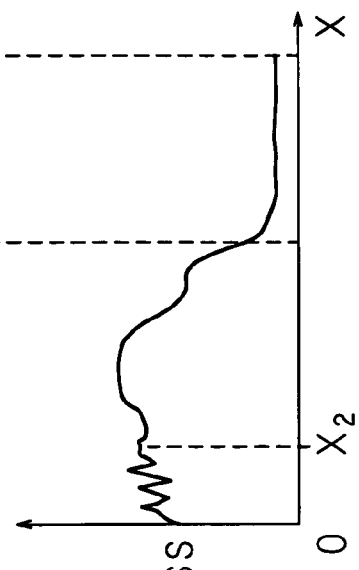
Figure 13C:
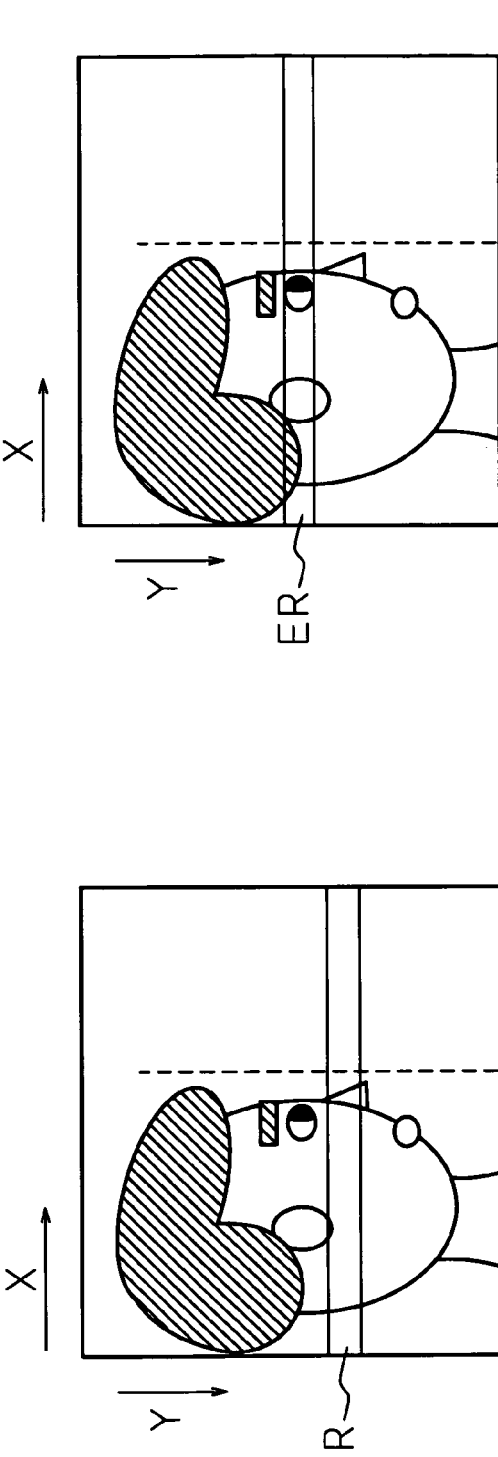
Figure 13C:
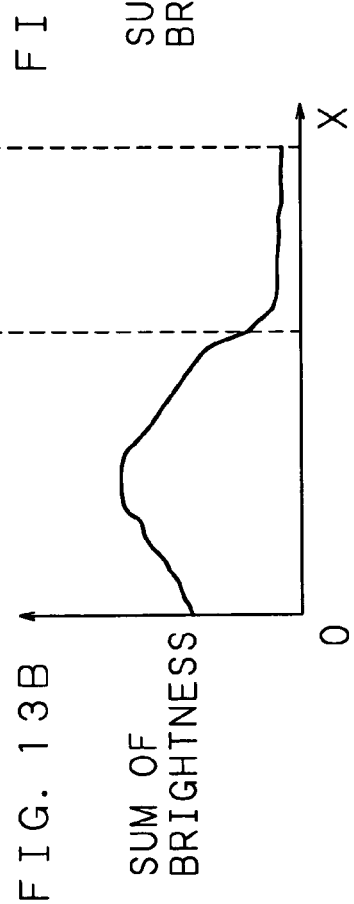

FIGS. 13A through 13D are views for explaining the face orientation detection process performed by the face orientation detection apparatus 1, for an image frame from which the nose position can not be detected. Similarly to FIG. 3A, FIG. 13A shows an example of the image frame acquired from the camera 2. As shown in FIG. 13B, one example of the image frame from which the nose position can not be detected is an image frame in which the local minimum value of the sum of brightness, which is the sum value of pixel data aligned in the vertical direction Y in the region R lower than the eye position by the predetermined number of pixels, calculated in the above-described nose detection process can not be specified.

Thus, when the nose position can not be detected (S38: NO), the CPU 10 operates as eye vicinity adding means for calculating the sum of brightness as the sum value of pixel data aligned in the vertical direction Y in a vicinity region of eyes indicated by ER in FIG. 13C, based on the eye position calculated by the eye detection process in step S33, and sequentially adds the pixel data aligned in the vertical direction Y in the eye vicinity region ER (S39). FIG. 13D shows a graph of the sum of brightness of pixel data aligned in the vertical direction Y in the region ER. Similarly to step S35, the CPU 10 extracts characteristic data of the sum of brightness thus calculated (S40), and detects the face orientation from the characteristic table in the HD 11, based on the extracted characteristic data (S41).

Note that the characteristic data mentioned here is data showing the characteristic that each sum of brightness varies extremely as shown in the range from the left end to position $X_2$ in the horizontal direction X. There is often the case that such an image frame represents the region of short hair, and such characteristic data is stored in the characteristic table in association with the orientation facing right, and consequently the CPU 10 can detect that the face of the driver faces right in step S41.

Figure 14:
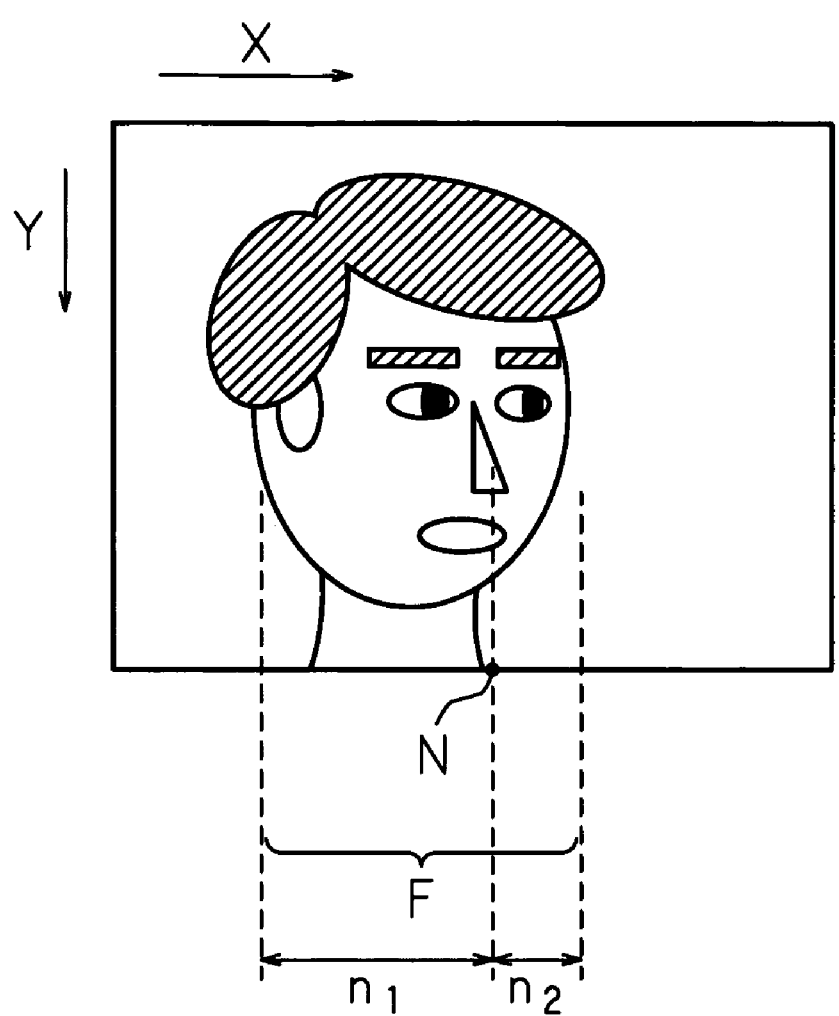
FIG. 14 is a view for explaining a face angle calculation process performed by the face orientation detection apparatus.

On the other hand, in step S38, when the nose position is detected (S38: YES), the CPU 10 operates as the orientation detecting means by executing the face orientation detection process in the HD 11, and detects the orientation including the face angle, based on the face region detected in step S32 and the nose position detected in step S37 (S42). FIG. 14 is a view for explaining a face angle calculation process. Based on an image frame as shown in FIG. 14, when a face region F and a nose ridge position N of the driver included in the image frame are detected, the CPU 10 calculates the face angle based, for example, on equation (1) shown below.

$$\theta = \sin^{-1}\{(n_1 + n_2)/2 - n_2\}/R \qquad (1)$$

Here, R is a preset average radius of the head of human being, $n_1$ is the distance from the left end position to the nose ridge position in the face region, and $n_2$ is the distance from the nose ridge position to the right end position in the face region. Here, since $R=(n_1+n_2)/2$ is satisfied, the face angle $\theta$ is obtained as following equation (2).

$$\theta = \sin^{-1}\{(n_1 - n_2)/(n_1 + n_2)\} \qquad (2)$$

As described above, based on the image frame photographed by the camera 2, the face orientation detection apparatus 1 detects the face region of the driver included in the image frame, and detects the eye position of the driver based on the image frame. Here, if the eye position can not be detected, the face orientation is detected based on the sum value of image data in the vertical direction Y of the image frame, which is calculated in detecting the face region. On the other hand, if the eye position is detected, the nose position is detected based on the detected eye position, and the face orientation is detected based on the detected nose position and the face region detected beforehand. Further, if the nose position can not be detected, the face orientation is detected based on the image data in a region in the vicinity of the eye position detected beforehand. Consequently, even in an image frame from which the eye or nose position can not be detected, it is possible to detect the face orientation more accurately, and, if the nose position can be detected, it is possible to detect not only the face orientation, but also the face angle.

For the above-described face orientation detection apparatus 1, by providing further structure to judge whether the face orientation detected in the above-mentioned manner is appropriate or not based on the running direction of the vehicle driven by the driver, it is possible to judge inattentive driving and warn the driver of inattentive driving when the face orientation of the driver is not appropriate. Moreover, the above-mentioned face orientation detection process can be applied not only to an image frame acquired by photographing the driver of a vehicle, but also to image frames acquired by photographing faces.

Note that in the above-described embodiment, although the face orientation detection apparatus 1 stores computer programs for operating various operations in the HD 11 and realizes the respective operations when the CPU 10 executes these computer programs, it is also possible to construct the respective operations by hardware.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An apparatus for detecting orientation of a face from image data acquired by photographing the face, the image data being composed of a plurality of pixel data aligned in horizontal direction and vertical direction, respectively, comprising:
   a horizontal adding section for adding the respective pixel data in the horizontal direction of the image data;
   an eye detecting section for detecting an eye position in the vertical direction based on a plurality of sum values calculated by said horizontal adding section;
   an eye vicinity adding section for adding the respective pixel data in the vertical direction in a vicinity region of the eye position detected by said eye detecting section; and
   an orientation detecting section for detecting a face orientation based on a plurality of sum values calculated by said eye vicinity adding section.

2. The face orientation detection apparatus of claim 1, further comprising:
   a vertical adding section for deriving a graph showing values of summation of the pixel data, which are calculated by adding the respective pixel data in the vertical direction of the image data, along the horizontal direction;
   an extracting section for extracting characteristic data of a plurality of sum values calculated by said vertical adding section; and
   a characteristic table storing the characteristic data in association with a plurality of face orientations,
   wherein said orientation detecting section selects, from said characteristic table, a face orientation corresponding to the characteristic data extracted by said extracting section.

3. An apparatus for detecting orientation of a face from image data acquired by photographing the face, the image data being composed of a plurality of pixel data aligned in horizontal direction and vertical direction, respectively, comprising:
   a horizontal adding section for adding the respective pixel data in the horizontal direction of the image data;
   an eye detecting section for detecting an eye position in the vertical direction based on a plurality of sum values calculated by said horizontal adding section;
   an eye vicinity adding section for adding the respective pixel data in the vertical direction in a vicinity region of the eye position detected by said eye detecting section;
   an orientation detecting section for detecting a face orientation based on a plurality of sum values calculated by said eye vicinity adding section;

a maximum value specifying section for specifying a maximum value of the sum values calculated by said horizontal adding section;

a local minimum value specifying section for specifying a local minimum value of the sum values calculated by said horizontal adding section; and a selecting section for selecting a sum value which is located higher in the vertical direction than a sum value specified as the maximum value by said maximum value specifying section and is specified as the local minimum value by said local minimum value specifying section, said eye detecting section detecting that a position in the vertical direction of the sum value selected by said selecting section is the eye position.

4. An apparatus for detecting orientation of a face from image data acquired by photographing the face, the image data being composed of a plurality of pixel data aligned in horizontal direction and vertical direction, respectively, comprising:

a horizontal adding section for adding the respective pixel data in the horizontal direction of the image data;

an eye detecting section for detecting an eye position in the vertical direction based on a plurality of sum values calculated by said horizontal adding section;

an eye vicinity adding section for adding the respective pixel data in the vertical direction in a vicinity region of the eye position detected by said eye detecting section;

an orientation detecting section for detecting a face orientation based on a plurality of sum values calculated by said eye vicinity adding section;

a local minimum value specifying section for specifying a local minimum value of the sum values calculated by said horizontal adding section; and a selecting section for selecting a sum value which is specified as the local minimum value by said local minimum value specifying section in second highest position in the vertical direction of the sum values calculated by said horizontal adding section, said eye detecting section detecting that a position in the vertical direction of the sum value selected by said selecting section is the eye position.

5. An apparatus for detecting orientation of a face from image data acquired by photographing the face, the image data being composed of a plurality of pixel data aligned in horizontal direction and vertical direction, respectively, comprising:

a region detecting section for detecting a face region in the horizontal direction from the image data;

a nose detecting section for detecting a nose position in the horizontal direction from the image data;

an orientation detecting section for detecting a face orientation based on the nose position detected by said nose detecting section and the region detected by said region detecting section a threshold storing section for storing thresholds;

a vertical adding section for adding the respective pixel data in the vertical direction of the image data;

a comparing section for comparing a sum value calculated by said vertical adding section and a threshold stored in said threshold storing section, and when the sum value is larger than the threshold as a result of comparison in said comparing section, said region detecting section judges that the pixel data calculated into the sum value are within the face region.

6. An apparatus for detecting orientation of a face from image data acquired by photographing the face, the image data being composed of a plurality of pixel data aligned in horizontal direction and vertical direction, respectively, comprising:

a region detecting section for detecting a face region in the horizontal direction from the image data;

a nose detecting section for detecting a nose position in the horizontal direction from the image data;

an orientation detecting section for detecting a face orientation based on the nose position detected by said nose detecting section and the region detected by said region detecting section;

a vertical adding section for adding the respective pixel data in the vertical direction of the image data;

a variation calculating section for calculating a variation in the horizontal direction of the sum values calculated by said vertical adding section; and a specifying section for specifying a face outline in the horizontal direction based on the variation calculated by said variation calculating section, said region detecting section detecting the face region based on the face outline specified by said specifying section.

7. An apparatus for detecting orientation of a face from image data acquired by photographing the face, the image data being composed of a plurality of pixel data aligned in horizontal direction and vertical direction, respectively, comprising:

a region detecting section for detecting a face region in the horizontal direction from the image data;

a nose detecting section for detecting a nose position in the horizontal direction from the image data;

an orientation detecting section for detecting a face orientation based on the nose position detected by said nose detecting section and the region detected by said region detecting section;

a pixel number storing section for storing a predetermined number of pixels;

a horizontal adding section for adding the respective pixel data in the horizontal direction of the image data;

an eye detecting section for detecting an eye position in the vertical direction based on a plurality of sum values calculated by said horizontal adding section;

an under eye adding section for adding the pixel data in the vertical direction in a region located lower than the eye position detected by said eye detecting section by the number of pixels stored in said pixel number storing section; and a local minimum value specifying section for specifying a local minimum value of the sum values calculated by said under eye adding section, said nose detecting section detecting that a position in the horizontal direction of the sum value specified as the local minimum value by said local minimum value specifying section is the nose position.

8. The face orientation detection apparatus of claim 5, further comprising:

a pixel number storing section for storing a predetermined number of pixels;

a horizontal adding section for adding the respective pixel data in the horizontal direction of the image data;

an eye detecting section for detecting an eye position in the vertical direction based on a plurality of sum values calculated by said horizontal adding section;

an under eye adding section for adding the pixel data in the vertical direction in a region located lower than the eye position detected by said eye detecting section by the number of pixels stored in said pixel number storing section; and a local minimum value specifying section for specifying a local minimum value of the sum values calculated by said under eye adding section, wherein said nose detecting section detects that a position in the horizontal direction of the sum value specified as the local minimum value by said local minimum value specifying section is the nose position.

9. The face orientation detection apparatus of claim 6, further comprising:

a pixel number storing section for storing a predetermined number of pixels;

a horizontal adding section for adding the respective pixel data in the horizontal direction of the image data;

an eye detecting section for detecting an eye position in the vertical direction based on a plurality of sum values calculated by said horizontal adding section;

an under eye adding section for adding the pixel data in the vertical direction in a region located lower than the eye position detected by said eye detecting section by the number of pixels stored in said pixel number storing section; and a local minimum value specifying section for specifying a local minimum value of the sum values calculated by said under eye adding section, wherein said nose detecting section detects that a position in the horizontal direction of the sum value specified as the local minimum value by said local minimum value specifying section is the nose position.

10. The face orientation detection apparatus of claim 7, further comprising:

a distance storing section for storing a predetermined distance;

a distance calculating section for, when a plurality of local minimum values are specified by said local minimum value specifying section, calculating a distance in the horizontal direction between sum values specified as the local minimum values; and a comparing section for comparing the distance calculated by said distance calculating section and the predetermined distance stored in said distance storing section, wherein, when the distance calculated by said distance calculating section is shorter than the predetermined distance as a result of comparison in said comparing section, said nose detecting section detects that a center portion in the horizontal direction of the two sum values separated by the distance is the nose position.

11. The face orientation detection apparatus of claim 8, further comprising:

a distance storing section for storing a predetermined distance;

a distance calculating section for, when a plurality of local minimum values are specified by said local minimum value specifying section, calculating a distance in the horizontal direction between sum values specified as the local minimum values; and a comparing section for comparing the distance calculated by said distance calculating section and the predetermined distance stored in said distance storing section, wherein, when the distance calculated by said distance calculating section is shorter than the predetermined distance as a result of comparison in said comparing section, said nose detecting section detects that a center portion in the horizontal direction of the two sum values separated by the distance is the nose position.

12. The face orientation detection apparatus of claim 9, further comprising:

a distance storing section for storing a predetermined distance;

a distance calculating section for, when a plurality of local minimum values are specified by said local minimum value specifying section, calculating a distance in the horizontal direction between sum values specified as the local minimum values; and a comparing section for comparing the distance calculated by said distance calculating section and the predetermined distance stored in said distance storing section, wherein, when the distance calculated by said distance calculating section is shorter than the predetermined distance as a result of comparison in said comparing section, said nose detecting section detects that a center portion in the horizontal direction of the two sum values separated by the distance is the nose position.

13. A method for detecting orientation of a face from image data acquired by photographing the face, the image data being composed of a plurality of pixel data aligned in horizontal direction and vertical direction, respectively, comprising:

adding using a processor, the respective pixel data in the horizontal direction of the image data;

detecting, using a processor, an eye position in the vertical direction based on a plurality of sum values calculated;

adding, using a processor, the respective pixel data in the vertical direction in a vicinity region of the detected eye position; and detecting, using a processor, a face orientation based on a plurality of sum values calculated for the vicinity region of eyes.

14. A computer readable medium encoded with a computer program that when executed by a computer causes the computer to detect orientation of a face from image data acquired by photographing the face, the image data being composed of a plurality of pixel data aligned in horizontal direction and vertical direction, respectively, by performing a method comprising:

causing the computer to add the respective pixel data in the horizontal direction of the image data;

causing the computer to detect an eye position in the vertical direction based on a plurality of sum values calculated;

causing the computer to add the respective pixel data in the vertical direction in a vicinity region of the detected eye position; and causing the computer to detect a face orientation based on a plurality of sum values calculated for the vicinity region of eyes.

\* \* \* \* \*

UNITED STATES PATENT AND TRADEMARK OFFICE
CERTIFICATE OF CORRECTION

PATENT NO. : 7,502,494 B2 Page 1 of 1
APPLICATION NO. : 10/763185
DATED : March 10, 2009
INVENTOR(S) : Akiyoshi Tafuku et al.

It is certified that error appears in the above-identified patent and that said Letters Patent is hereby corrected as shown below:

On the Title Page Item (73) (Assignee), change "Fujtisu" to --Fujitsu--.

Column 20, Line 29, change "adding" to --adding,--.

Signed and Sealed this

Nineteenth Day of May, 2009

JOHN DOLL
*Acting Director of the United States Patent and Trademark Office*